June 9, 1942.    A. E. MAAGE, JR    2,285,829
DAMPER REGULATOR
Filed July 15, 1939    2 Sheets-Sheet 1
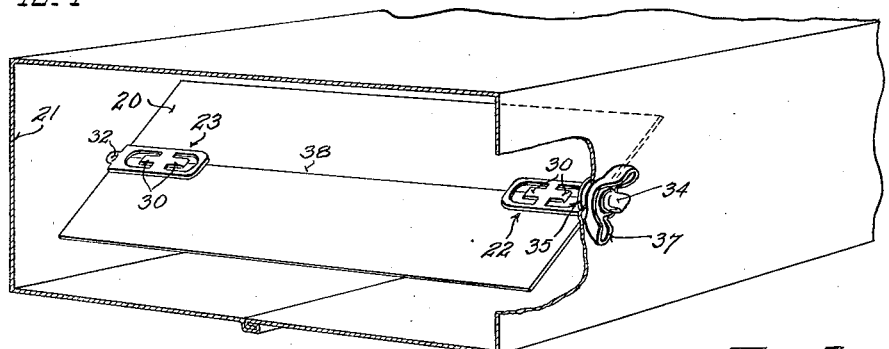
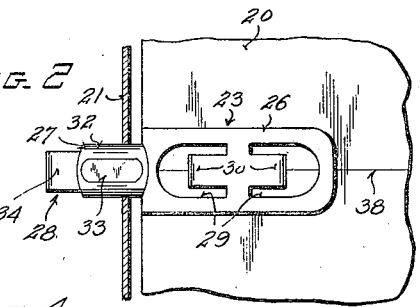
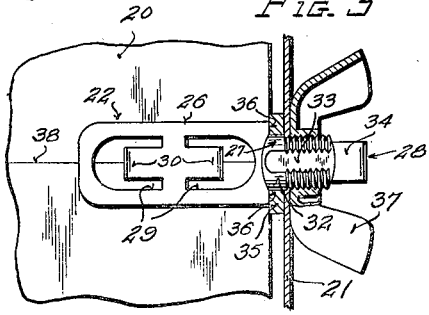
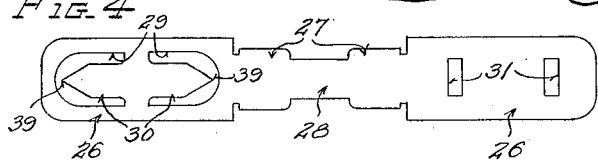
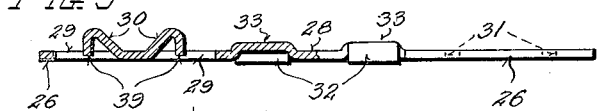
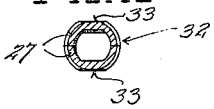
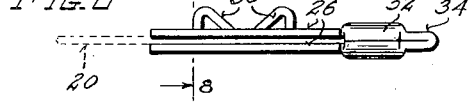
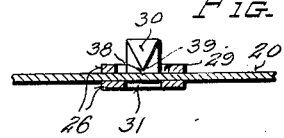
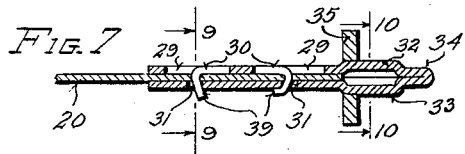
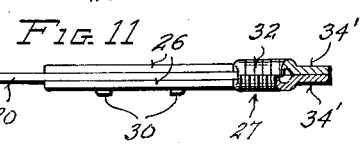
INVENTOR
ALFRED E. MAAGE JR.
BY
Erwin B. Eining
ATTORNEY June 9, 1942.       A. E. MAAGE, JR       2,285,829
DAMPER REGULATOR
Filed July 15, 1939       2 Sheets-Sheet 2
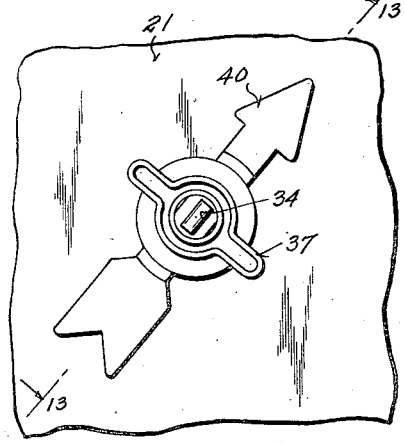
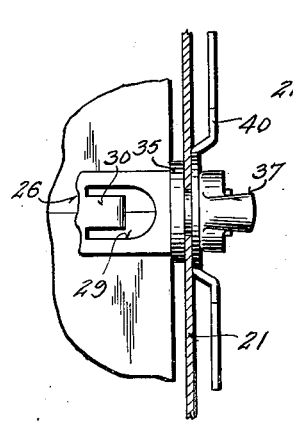
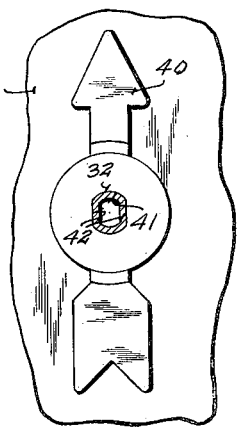
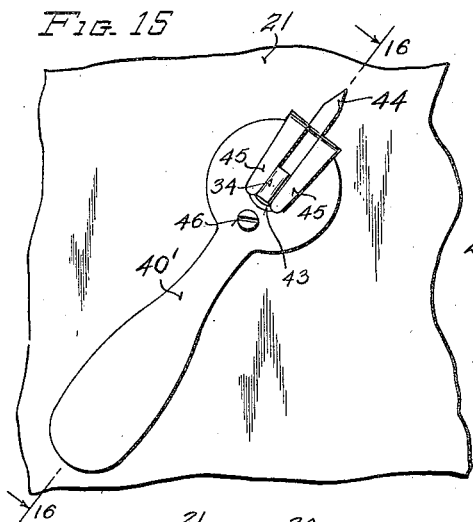
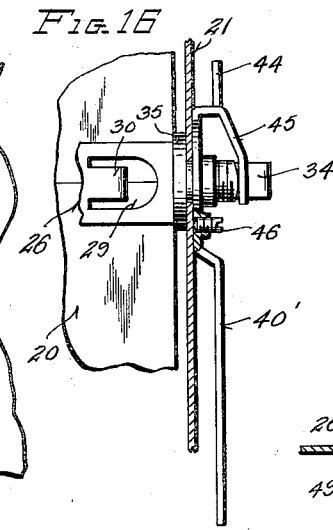
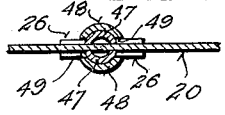
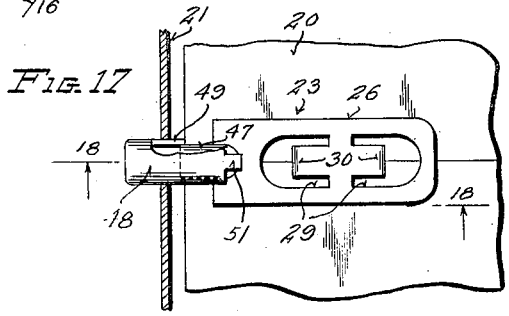
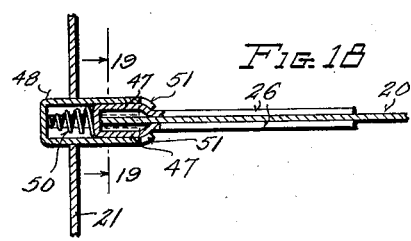
INVENTOR
ALFRED E. MAAGE, JR.
BY
Erwin B. Ewing
ATTORNEY Patented June 9, 1942

2,285,829

UNITED STATES PATENT OFFICE 2,285,829

DAMPER REGULATOR

Alfred E. Maage, Jr., Milwaukee, Wis.

Application July 15, 1939, Serial No. 284,637

12 Claims. (Cl. 251—11)

This invention relates to damper regulators.

The primary object of the present invention resides in the provision of a new and improved sheet metal damper regulator.

A further object resides in the provision in a sheet metal damper regulator of improved means for aligning the regulator on the damper.

A further object resides in the provision in a sheet metal damper regulator of improved anchoring means therefor.

A further object resides in the provision in a sheet metal damper regulator of improved damper actuating and position indicating means.

A further object of the invention resides in the provision of new and improved sheet metal damper regulator adapted to be formed by means of a punch press process whereby production is materially increased and cost materially reduced.

A further object resides in the provision in a sheet metal damper regulator of cooperating tang elements on one side of a damper receiving element and cooperating tang receiving slots on the other side of the element adapted to provide means for securely anchoring the damper regulator to the damper to insure against vibration between the two parts.

A further object resides in the provision of head and tail pieces formed substantially identical whereby the initial die costs are materially reduced.

A further object resides in the provision of means on the damper regulator adapted for self-retention in desired position of adjustment on the damper.

Another object resides in the provision of tang means on the damper regulator adapted to be brought into proper alignment with a scribed centerline on the damper to insure proper alignment of said head and tail pieces on the damper.

A further object resides in the provision of tang means on said damper regulator adapted to position and retain the same on the damper by the use of a single instrument, such as a hammer, to drive the tangs through said damper and in doing so to deform the damper metal within the confines of an aligned tang receiving slot to provide a rattle-proof construction.

A further object resides in the provision of a new and sturdy construction which is adapted to be applied to the damper in an extremely simple and time saving manner.

Other objects and advantages will become manifest from the following description of illustrative embodiments of the present invention.

In the drawings:

Figure 1 is a perspective view of an air conduit equipped with an adjustable damper element provided with damper regulator means constructed in accordance with the teachings of the present invention;

Fig. 2 is a fragmentary elevational view of a portion of the air conduit and damper showing the tailpiece in elevation;

Fig. 3 is a fragmentary view of the air conduit and damper showing a headpiece of the damper regulator in elevational view with damper position retaining means in the form of a wing nut applied to the headpiece.

Fig. 4 is a pattern view of a sheet metal blank from which either a head or tail piece damper regulator may be formed;

Fig. 5 is a side elevational view partly in section of a partially formed damper regulator;

Fig. 6 is a side elevational view of a completely formed head or tail piece of a damper regulator;

Fig. 7 is a longitudinal vertical sectional view through a headpiece of a damper regulator showing the tang means for retaining the same in fixed position upon the damper;

Fig. 8 is a vertical transverse sectional view on the line 8—8 of Fig. 6 showing the aligning and anchoring tang in adjusted position above a scribed centerline on the damper;

Fig. 9 is a transverse vertical sectional view on the line 9—9 of Fig. 7 showing the aligning and anchoring tang driven through the damper and illustrating the deforming operation of the tang on the damper within a slot formed in the portion of the damper regulator;

Fig. 10 is a vertical sectional view on the line 10—10 of Fig. 7 showing the cooperating semicircular bearing portions provided with diametrically disposed flats and screw threads;

Fig. 11 is a side elevational view of a damper regulator formed of two cooperating elements joined by means of spot welding adjacent one extremity thereof to form a manually engageable damper regulating element and damper position indicating means;

Fig. 12 is a fragmentary side elevational view of an air conduit showing a damper regulator headpiece constructed in accordance with the teachings of the present invention and having mounted thereon an indicator arrow adapted to provide ready visible means for indicating the damper position within the air conduit;

Fig. 13 is a sectional view on the line 13—13 of Fig. 12 showing the relative position of the several elements shown in Fig. 12;

Fig. 14 is an elevational view similar to Fig. 12 with the damper retaining wing nut removed to illustrate the means for retaining the indicating arrow in position on the bearing portion of the damper regulator;

Fig. 15 is a fragmentary elevational view of an air conduit provided with an operating handle or quadrant of modified form adapted to be self-retaining upon the damper regulator;

Fig. 16 is a sectional view on the line 16—16 of Fig. 15 showing the relative position of the elements shown in Fig. 15;

Fig. 17 is an elevational view of a modified form of retractable tailpiece damper regulator;

Fig. 18 is a vertical sectional view taken on the line 18—18 of Fig. 17 disclosing the structural details of the retractable tailpiece; and Fig. 19 is a vertical sectional view on the line 19—19 of Fig. 18 illustrating the formation of the guide means for the retractable element of the tailpiece.

The damper regulator chosen for illustrative purposes in the accompanying drawings is shown applied to a damper 20 positioned within an air conduit 21 by means of a head piece 22 and a tailpiece 23 constructed in accordance with the teachings of the present invention.

The head and tail pieces 22 and 23 are identical in size and shape and are formed from identical blanks such as the one shown in Fig. 4 of the drawings. The blanks may be cut from a milled flat wire of sheet metal stock with the minimum of waste as shown by the contour of the blank.

The blank comprises a pair of end portions 26, a pair of intermediate portions 27 and a central portion 28. One of the end portions 26 is provided with a pair of axially spaced openings 29 delineating tangs 30. The other end portion 26 is provided with a pair of axially spaced tang receiving apertures 31. The intermediate portions 27 serve to respectively provide bearing halves 32. Each of the bearing portions 32 is provided with a flat portion 33 for a purpose to be hereinafter more specifically explained. The central portion 28 provides a manually engageable damper regulating portion 34 when the blank has been completely formed.

The method of forming the sheet metal damper head and tail pieces comprises the stamping of a blank, followed by the forming of semi-circular bearing portions 32 and the bending of the tangs 30 to the position shown in Fig. 5 of the drawings. The blank is then folded on the transverse medial line to form the body of a head or tail piece. It should be noted at this time that the central portion 28 of the blank is folded upon itself to provide a substantially flat manually engageable damper regulating element, that the intermediate portions 27 which have been formed into semi-circular bearing portions 32 unite to form a cylindrical bearing surface, and that the end portions 26 lie in spaced relationship such that the axially spaced tangs 30 in one end portion 26 lie in alignment with the axially spaced tank receiving apertures 31 formed in the other end portion 26. With the completion of the folding operation the tailpiece 23 is completed. A headpiece 22 may be formed by the application of a washer 35 over the cylindrical bearing portion 32 pressed into contact with shoulder portions 36 formed on the end portions 26 adjacent the bearing portion 32. The cylindrical bearing portion 32 may then be screw threaded to receive a wing nut 37 adapted to retain the damper in adjusted position after it has been positioned within the air conduit 21.

The method of applying the head and tailpieces 22 and 23 to the damper 20 is extremely simple. Under normal conditions the workman applies a scribe line 38 along the longitudinal center of the damper, in the instance the same is to be applied to an air conduit of rectangular form (as shown in the drawings) or a diameter line in the event that the damper is circular for application to the round pipe. The spaced parallelly disposed end portions 26 of the regulators are adapted to slidably receive an edge of the damper 20. The head or tailpiece may be slid to a position where points 39 formed on the ends of the several tangs lie directly above the scribe line 38 when the damper edge has been inserted to a position where it contacts either the inner end of the bearing portion 32 in the case of the tailpiece 23 or the inner surface of the washer 35 in the case in the headpiece 22. The spacing between the portions 26 of the damper regulators is such that the damper is frictionally engaged therewith to prevent the regulator from falling therefrom or being dislodged thereon in the course of normal handling. After the head or tail-pieces have been so positioned upon the damper 20 it may be anchored thereon merely by the strike of a hammer blow upon each upstanding tang 30 to drive the tang through the damper and also through the aligned aperture 31 in the cooperating portion 26. To complete the securing operation the damper is turned over and a hammer blow is directed on to the extending portion of the tang 30 to turn it inwardly and downwardly onto the face of the portion 26. During the process of the piercing operation the tang 30 will deform the metal of the damper against the end or side walls of the apertures 31 and when the tangs 30 are clinched in position on the portions 26 the resulting anchorage between the regulator and the damper is absolutely rattle-proof.

A modified form of regulator is shown in Fig. 11 of the drawings, the regulator in this form comprises a pair of elements respectively shaped in the manner of each half of the blank shown in Fig. 4. Each half is formed in the identical manner described with respect to the preceding form of regulator. The sole difference between the two regulators lies in the fact that the two halves are joined by welding the manually engageable damper regulating portions 34'. In some instances it may be advisable to utilize this method of forming a sheet metal damper regulator.

In the forms of the invention previously described comment has been repeatedly directed to the manually engageable regulating portion 34. The fact is noted that this point, that the portion 34 extends outwardly from the end of the bearing portion 32 in such manner that it will lie outside of the air conduit 21. This portion 34 is adapted to be engaged by a wrench or a pair of pliers for the purpose of angularly displacing the damper 20 within the air conduit 21. Since the manual engageable portion 34 lies in a common plane with the damper 20, the portion 34 in addition to providing a means for angularly displacing the damper within the conduit also provides a visible means for ascertaining the angle of the damper within the conduit.

A modified form of damper position indicating means is shown in Figs. 12, 13 and 14. This modified damper position indicating means comprises an indicator arrow 40 having point and tailpiece aligned with the damper. The central portion of the arrow 40 is provided with an aperture 41 having flattened sides 42 adapted to be received respectively over the cylindrical bearing portion 32 and the flats 33 formed on the headpiece 22. The damper position may be manually adjusted by loosening the wing nut 37 and turning the arrow 40 or by applying a wrench or pair of pliers to the portion 34 of the headpiece 22. When the damper has been adjusted to desired position it may be releasably retained therein by tightening the wing nut 37 to clamp the wall of the conduit 21 between the washer 35 and the indicating arrow 40.

Another modified form of damper position indicating means and actuating quadrant or handle is shown in Figs. 15 and 16 of the accompanying drawings. In this form a sheet metal quadrant or operating handle 40' is provided with a centrally disposed threaded aperture 43 adapted to be threaded onto the cylindrical bearing portion 32 of the headpiece 22 to a position where the frictional contact between the quadrant and the wall of the air conduit 21 is of sufficient strength to permit manual movement of the damper without permitting accidental movement thereof. The upper portion of a quadrant is provided with an indicating pointer 44 and a pair of laterally spaced ears 45 adapted to be turned inwardly to span the extremity of the damper operating portion 34 to securely retain the same against movement with respect to the quadrant 40'. A dog toothed set screw 46 is threadedly received within an aperture formed in the quadrant adjacent the threaded aperture 43. When the damper 20 has been swung to its desired position by operating the handle of the quadrant the same may be releasably retained in adjusted position by turning the screw 46 into engagement with the wall of the air conduit 21.

A modified form of tail piece 23 is shown in Figs. 17, 18 and 19 of the drawings. The tail shown in these figures of the drawings, is of the rectractable type to facilitate application of the damper to the air conduit. In the form previously described it is common practice for the workman to bend the damper sufficiently to permit the head and tail pieces to be received into the conduit and then rebend the damper to effect their extension through apertures formed in the wall of the conduit to position the same in the conduit. In the modification the retractable tail piece provides a simple and effective means for applying the damper without necessitating the bending of the same. In this form, the body portion of the regulator which is fashioned in the manner similar to the one previously described, is further provided with raised guide elements 47. These elements serve to slidably receive a thimble portion 48 preferably provided with a diametrically disposed slot 49 adapted to be received over the body portion of the tailpiece 23. A conical coil spring 50 lies between the extremity of the tailpiece body and the inner face of the thimble portion 48 to normally urge the same outwardly to its extreme position which is regulated by the contact of inwardly directed end portions 51 formed on the thimble 48. The damper provided with the retractable tailpiece may be applied to the air conduit by pressing the thimble portion 48 inwardly to compress the coil spring to permit the introduction of the damper into the air conduit. The same may be slid along the conduit to a position in which the head and tail pieces are aligned with damper receiving apertures therein; at which time the spring 50 effects outward movement of the thimble 48 through the aperture to position the damper in the conduit.

From the foregoing description of the present invention it will be noted that a sheet metal damper regulator of simple, inexpensive and improved design has been provided. The novel method of forming a sheet metal damper regulator provides an improved inexpensive means for obtaining an article which hitherto has required, for the most part expensive machine operations. In addition to providing an improved method or process of manufacturing a sheet metal damper regulator, the present invention provides improved means for applying, retaining and adjusting a damper by the application of damper regulator constructed in accordance with the teachings of the present invention.

While the invention has been described to considerable detail in the foregoing specification, it is understood that various changes may be made in its embodiments without departing from or sacrificing any of the advantages hereinafter claimed.

I claim:

1. A damper regulator for an adjustable damper in an air conduit comprising, a pair of sheet metal stampings forming respectively a headpiece and a tailpiece, each of said pieces having a pair of spaced damper engaging portions adapted to slidably receive opposite edges of the damper, a bearing portion on each piece adapted to extend through the wall of the air conduit, and a manually engageable portion formed integrally with one of said pieces adapted to provide means for adjusting the position of the damper within the air conduit.

2. A damper regulator for an adjustable damper in an air conduit comprising, a pair of sheet metal stampings forming respectively a headpiece and a tailpiece, each of said pieces having a pair of spaced damper engaging portions adapted to slidably receive opposite edges of the damper, a bearing portion on each piece adapted to extend through the wall of the air conduit, a manually engageable portion formed integrally with one of said pieces adapted to provide means for adjusting the position of the damper within the air conduit, and means on said headpiece for releasably retaining the damper in adjusted position.

3. A damper regulator for an adjustable damper in an air conduit comprising, a sheet folded metal stamping having a pair of damper engaging portions adapted to slidably receive the edge of the damper, a bearing portion on said regulator adapted to extend through the wall of the air conduit, said bearing portion comprising an extended part of each of said damper engaging portions, a manually engageable damper regulating portion on said regulator, and means formed integrally with said regulating means adapted to retain said regulating means on the damper.

4. A damper regulator for an adjustable damper in an air conduit comprising, a sheet metal stamping having a pair of damper engaging portions adapted to slidably receive the edge of the damper, a bearing portion on said regulator adapted to extend through the wall of the air conduit, a manually engageable damper regulating portion formed integrally with said regulator, a tang formed integrally with one of said damper engaging portions, and a tang receiving aperture formed in the other of said damper engaging portions, said tang and tang aperture cooperating to provide means for anchoring said regulator means on the damper.

5. A damper regulator for an adjustable damper in an air conduit comprising, a sheet metal stamping having a pair of damper engaging portions adapted to slidably receive the edge of the damper, a bearing portion on said regulator adapted to extend through the wall of the air conduit, said bearing portion comprising an extended part of each of said damper engaging portions, a manually engageable damper regulating portion on said regulator, a pair of longitudinally spaced tangs on one of said damper engaging portions, and a pair of longitudinally spaced tang receiving apertures in the other of said damper engaging portions, said tangs adapted to be driven through the damper and tang receiving apertures to provide secure anchorage for said damper regulator on the damper.

6. A damper regulator for an adjustable damper in an air conduit comprising, a sheet metal stamping having a pair of damper engaging portions adapted to slidably receive the edge of the damper, a bearing portion on said regulator adapted to extend through the wall of the air conduit, a manually engageable damper regulating portion on said regulating means, a pair of longitudinally spaced pointed tanges on one of said damper engaging portions, and a pair of longitudinally spaced tang receiving apertures in the other of said damper engaging portions said pointed tangs serving as a means for aligning said damper regulator on the damper to insure its proper disposition thereon, said tangs adapted to be driven through the damper and tang receiving apertures to provide secure anchorage for said damper regulator on the damper.

7. A damper regulator for an adjustable damper in an air conduit comprising, a sheet metal stamping forming a head piece having a pair of damper engaging portions, a bearing portion formed integrally with said damper engaging portions, and a manually engageable portion adapted to adjust the position of the damper in the air conduit, said damper engaging portion having means formed integral therewith for anchoring said regulator on the damper.

8. A damper regulator for an adjustable damper in an air conduit comprising, a sheet metal stamping forming a head piece having a pair of damper engaging portions, a bearing portion formed integrally with said damper engaging portions, and a manually engageable portion adapted to adjust the position of the damper in the air conduit, said damper engaging portion having means formed integral therewith for anchoring said regulator on the damper, said bearing portion adapted to threadedly receive means for releasably retaining the damper in adjusted position.

9. A damper regulator and bearing member for an adjustable damper in an air conduit comprising, a folded sheet metal element having a pair of spaced damper engaging portions adapted to slidably receive the damper, a bearing thereon formed by the abutting relationship of a pair of semi-cylindrical portions on said element, and a manually engageable portion extending outwardly from said bearing adapted to provide means for adjusting the damper in the air conduit and providing visible means for determining the damper position.

10. A damper regulator and bearing member for an adjustable damper in an air conduit comprising, a folded sheet metal element having a pair of spaced damper engaging portions adapted to slidably receive the damper, a tang formed on one of said portions, a tang receiving aperture formed in the other of said portions, said tang and aperture providing means for anchoring the damper regulator on the damper, a bearing on said element formed by the abutting relationship of a pair of semi-cylindrical portions on said element, and a manually engageable portion extending outwardly from said bearing adapted to provide means for adjusting the damper in the air conduit and providing visible means for determining the damper position.

11. A damper regulator for an adjustable damper in an air conduit comprising, a folded sheet metal body portion including a pair of spaced damper engaging portions, a pair of substantially semi-cylindrical bearing portions adapted to cooperate to form a bearing for the damper, and a manually engageable portion extending axially from said bearing portion and terminating at its outer end in the fold of said damper regulator, said manually engageable portion providing means for adjusting the angular position of the damper in the air conduit.

12. A damper regulator for an adjustable damper in an air conduit comprising, a folded sheet metal body portion including a pair of spaced damper engaging portions, a pair of substantially semi-cylindrical bearing portions extending axially from said damper engaging portions, said bearing portions cooperating to form a bearing for the damper, and a manually engageable portion extending axially from said bearing portion and terminating at its outer end in the fold of said damper regulator, said manually engageable portion providing visible means for adjusting and determining the position of the damper in the air conduit.

ALFRED E. MAAGE, Jr.